US012207744B2

(12) United States Patent
Szack

(10) Patent No.: US 12,207,744 B2
(45) Date of Patent: Jan. 28, 2025

(54) POWERED DEVICE WITH MULTIPLE ROTATING TURNTABLES

(71) Applicant: John Christopher Szack, Walkerton (CA)

(72) Inventor: John Christopher Szack, Walkerton (CA)

(*) Notice: Subject to any disclaimer, the term of this patent is extended or adjusted under 35 U.S.C. 154(b) by 187 days.

(21) Appl. No.: 17/203,878

(22) Filed: Mar. 17, 2021

(65) Prior Publication Data

US 2022/0296010 A1 Sep. 22, 2022

(51) Int. Cl.
*A47F 5/025* (2006.01)
*A47F 7/00* (2006.01)
*A47G 7/04* (2006.01)

(52) U.S. Cl.
CPC ............ *A47F 5/025* (2013.01); *A47F 7/0078* (2013.01); *A47G 7/041* (2013.01); *A47G 2007/048* (2013.01)

(58) Field of Classification Search
CPC ....... A47F 5/025; A47F 7/0078; A47G 7/041; A47G 2007/048; A47B 49/004; A47B 49/008
See application file for complete search history.

(56) References Cited

U.S. PATENT DOCUMENTS

| | | | | |
|---|---|---|---|---|
| 466,767 A * | 1/1892 | Brock et al. | ............ | A47B 49/00 108/103 |
| 631,306 A * | 8/1899 | Hollingsworth | ........ | G09F 11/23 472/6 |
| 729,642 A * | 6/1903 | Nash | ...................... | A47B 11/00 211/121 |
| 997,518 A * | 7/1911 | Taylor | ..................... | A47F 5/025 248/329 |
| 1,208,457 A * | 12/1916 | Bellville | ................ | A47B 11/00 108/94 |
| 1,254,983 A * | 1/1918 | Chadwick | ................. | A47F 3/08 108/22 |
| 1,517,417 A * | 12/1924 | Floyd | .................... | A47F 5/0037 472/40 |
| 1,768,217 A * | 6/1930 | Schlick | .................. | A47F 5/025 108/20 |

(Continued)

FOREIGN PATENT DOCUMENTS

CA 2802240 A1 7/2013
CN 203748863 U 8/2014

(Continued)

OTHER PUBLICATIONS

International Search Report issued on May 12, 2022 in respect of PCT International Patent Application No. PCT/CA2022/050380.

*Primary Examiner* — Stanton L Krycinski
(74) *Attorney, Agent, or Firm* — Rosenberg, Klein & Lee

(57) ABSTRACT

Embodiments of the invention as described herein relate to a series of linked rotatable turntables that can be powered by various means. The turntables are mounted onto a frame that can be configured into a plurality of different shapes and sizes. The turntables can be configured in numerous different heights and sizes and they can be driven in either a clockwise or counterclockwise direction. The device can be driven via various different mechanisms including, but not limited to, chain, belt hydraulic and pneumatic. The device may be powered by, for example, mains, battery or solar.

20 Claims, 7 Drawing Sheets

(56) References Cited

U.S. PATENT DOCUMENTS

| | | | | |
|---|---|---|---|---|
| 1,826,533 | A | * | 10/1931 | Steele .................. A47F 5/025 211/1.55 |
| 1,915,741 | A | * | 6/1933 | Lomnitz ............... A47F 5/025 108/22 |
| 2,157,404 | A | * | 5/1939 | Dodge .................. A47F 5/025 104/44 |
| 2,512,465 | A | * | 6/1950 | Moorhouse ........... A47F 3/11 40/473 |
| 3,506,260 | A | * | 4/1970 | Johnson ................ A63G 1/26 472/29 |
| 3,897,063 | A | * | 7/1975 | Lehwalder ...... A63F 3/00895 273/284 |
| 4,179,168 | A | * | 12/1979 | Isaac ..................... A47F 3/10 312/305 |
| 4,850,658 | A | * | 7/1989 | Sandor .................. A47F 5/02 211/85.2 |
| 5,088,604 | A | * | 2/1992 | Baur ................... G11B 15/688 211/163 |
| 5,109,989 | A | | 5/1992 | Kremmin et al. |
| 5,896,699 | A | | 4/1999 | Livingston et al. |
| 6,128,854 | A | | 10/2000 | Chaney |
| 6,945,872 | B2 | * | 9/2005 | De Vogel ............. A63H 13/20 472/63 |
| 7,665,244 | B2 | | 2/2010 | Jesness, III |
| 8,132,359 | B1 | | 3/2012 | Hudak |
| 8,272,519 | B1 | | 9/2012 | Rekhels |
| 9,220,356 | B2 | * | 12/2015 | Hognaland ............ B65G 1/133 |
| 9,822,920 | B2 | * | 11/2017 | Lai ........................ G03B 37/00 |

FOREIGN PATENT DOCUMENTS

| | | | | |
|---|---|---|---|---|
| CN | 109288328 | A | | 2/2019 |
| CN | 110269439 | A | | 9/2019 |
| DE | 837805 | C | * | 5/1952 |
| FR | 639854 | A | * | 7/1928 |
| FR | 2038543 | A5 | * | 1/1971 |
| GB | 353742 | A | * | 7/1931 |
| GB | 762204 | A | * | 11/1956 |
| GB | 819888 | A | * | 9/1959 |
| GB | 2227164 | A | | 7/1990 |
| WO | WO-9902076 | A1 | * | 1/1999 ............ A47F 5/025 |
| WO | WO-2019056520 | A1 | * | 3/2019 ............ A47F 5/025 |

* cited by examiner

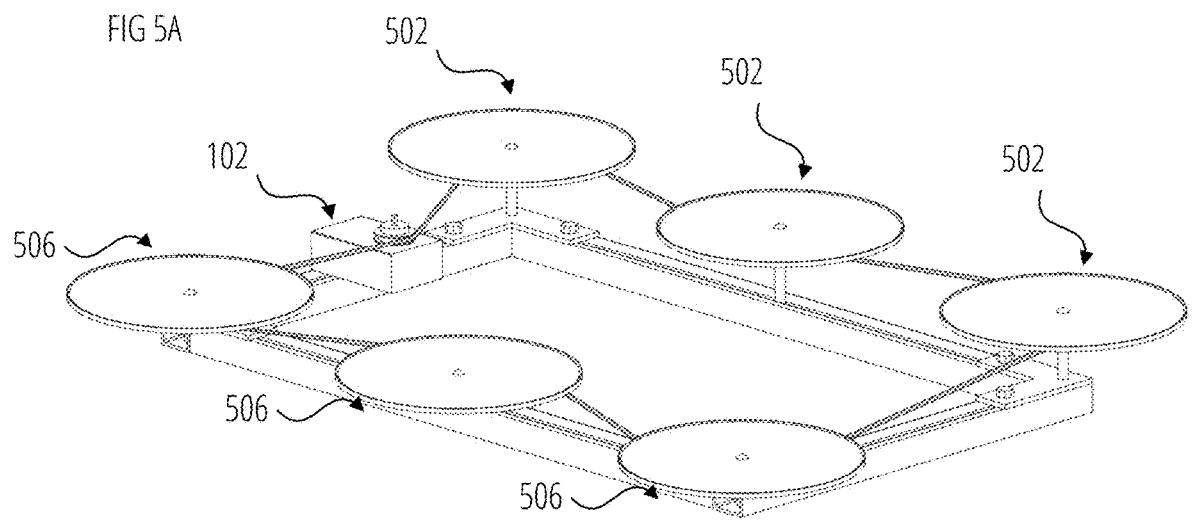
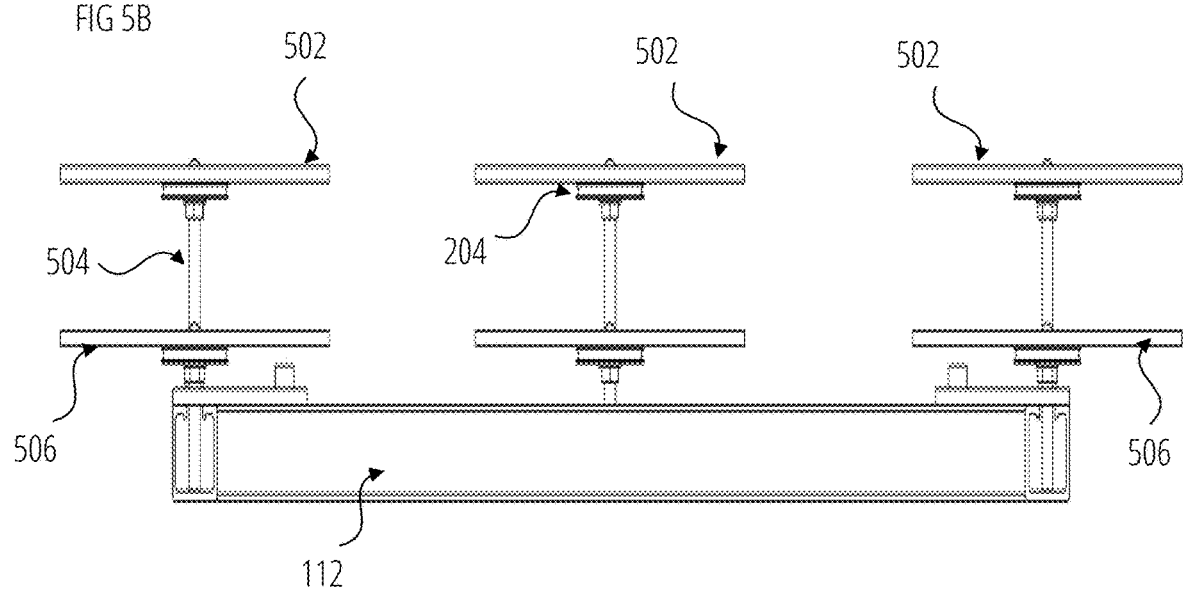

A   B   C   D   E   F

POWERED DEVICE WITH MULTIPLE ROTATING TURNTABLES

FIELD OF THE INVENTION

The present invention relates generally to the field of devices having multiple rotating turntables, specifically to devices having multiple rotating turntables which may be of differing sizes and heights, more specifically to multiple rotating turntables that can be used in a variety of different applications ranging from horticulture to commercial displays.

BACKGROUND

The instant application relates to a series of rotatably linked turntables that may find use in various fields from growing plants to displaying consumer items. Numerous rotatable stands are known, for example:

CN203748863 discloses a planetary type rotary display stand. The rotary display stand, comprises a main table body, a rotary tabletop and small rotary discs, wherein the rotary tabletop and the small rotary discs are arranged on the main table body in sequence. The planetary type rotary display stand has the advantages that due to the rotation of the rotary tabletop, dishes put on the small rotary discs can rotate along with the rotation of the rotary tabletop and are from far to near, so that the difficulty that persons at the periphery of the rotary tabletop cannot reach the dishes is effectively solved. This application relates to rotary discs that rotate around their own axis and also around a central axis around which all of the rotary discs rotate. Consequently, this device and only functions to display items in a circular configuration.

U.S. Pat. No. 7,665,244 discloses a plant mover system and method. A system and method for rotating multiple plants through light on a continual basis and feeding plants while they are rotated. This system rotates multiple plants on two disks so that every surface of the plants is exposed to light. The plant mover has two or more small disks, which are placed on a larger outer disk. The larger disk is rotated by a motor. The plants sit on the small disks which are placed on top of the large disk. As the large disk is rotated by the motor the small disks on top rotate as well. This application again works by having rotary discs that rotate around their own axis and also around a central axis around which all of the rotary discs rotate. A series of cogs on the larger disc cooperate with cogs on the small discs. Consequently, this device and only functions to display items in a circular configuration.

CN110269439 discloses a kind of ornaments show stand. The jewelry display table comprises a display table body, a base is arranged at the lower end of the display table body, a rotation device driving the display table body to rotate is arranged in the base. The base is fixedly installed on a table, a first motor is turned on, so that a motor shaft, a first bevel gear and a second bevel gear are driven to rotate the jewelry display table can safely display valuable commodities such as necklaces and rings. It appears that this application does not have multiple tables or discs, and the tables or discs do not appear to individually rotate.

U.S. Pat. No. 5,109,989 discloses a rotary display stand. A solar powered rotary display is assembled on a base having a stationary table mounted on a post fixed to the base, a rotary table mounted for rotation on the base about a main axis defined by the post, and a plurality of display disks mounted for rotation on the rotary table about respective planetary axes carried by the rotary table. Each of the drive wheels includes an annular friction surface in contact with both an upper surface of the base and a bottom surface of the display disks for rotating the disks in a fixed ratio with rotation of the rotary table. Again, this application relates to rotary discs that rotate around their own axis, and also around a central axis around which all of the rotary discs rotate. Consequently, this device and only functions to display items in a circular configuration.

CN109288328 discloses a kind of rotation crops show stand. The rotation crops show stands include a show stand, plant transparent display cabinet and main show-plate, the surrounding of the main show-plate is arranged multiple for placing the plant transparent display cabinet for showing single crops, the top center of the show stand is provided with for placing the main show-plate for showing multiple crops, and the plant transparent display cabinet and main show-plate are connected with the epicyclic gearing transmission being arranged in inside show stand respectively. This application relates to rotary show plates that rotate around their own axis, and also around a central axis around which all of the rotary show plates rotate. Consequently, this device and only functions to display items in a circular configuration.

CA2802240 discloses a rotating plant stand. The rotating stand includes a turner casing base and a turner casing top rotatably coupled with the turner casing base. A motor drive assembly is coupled with the turner casing base, wherein the motor drive assembly is configured to rotate the turner casing top relative to the turner casing base. A motor controller is coupled with the turner casing base, wherein the motor controller is configured to cause the motor drive assembly to rotate the turner casing top relative to the turner casing base using alternating clockwise and counter-clockwise rotational motions. This application relates to a single stand-alone turntable, with no suggestion of modifications to include multiple turntables.

U.S. Pat. No. 8,272,519 discloses a rotatable display carousel. The rotatable display carousel may include a stationary central rod and a bottom plate rotatably mounted about the central rod. A plurality of shelf sections may be rotatably positioned above the bottom plate respectively. A rotating mechanism may be used to simultaneously rotate each shelf section respectively by rotating the bottom plate about the central rod. This application relates to rotary discs that rotate around their own axis and also around a central axis around which all of the rotary discs rotate. Consequently, this device and only functions to display items in a circular configuration.

U.S. Pat. No. 8,132,359 discloses a revolving flower pot saucer. The revolving saucer is mounted within top surface of the base with the flower pot positionable upon the revolving saucer. At least one solar panel is positioned on the angled top surface of the base. A motor is mounted within the base and powered only by the solar panel with the motor connected between the solar panel and the revolving saucer and the motor causing the rotation of the revolving saucer wherein the junction of the outer surface and the top surface of the base creates an outer edge and wherein the angling of the top surface of the base allows any liquids or other debris spilled on the top surface to drain off the top surface toward the outer surface and over the outer edge. Again, this application relates to a single stand-alone turntable, with no suggestion of modifications to include multiple turntables.

U.S. Pat. No. 6,128,854 discloses a potted plant turntable. The potted plant turntable including a base and a rotating dish. The rotating dish supports a potted plant which is slowly rotated with the dish to allow even exposure of the plant to sunlight. The dish rests on a bearing collar of the base and is gear driven by an AC or solar powered motor. This application is another example of a single stand-alone turntable, with no suggestion of modifications to include multiple turntables.

GB2227164 discloses interlinked turntable support for plant pots. The plant pot support has a number of turntables on which individual flower pots are mounted. The turntables are all interlinked so that when one is rotated, all are rotated. This enables a whole series of plants in plant pots to be turned simultaneously to face the light. Simultaneous rotation can be achieved by the use of a continuous cord around the periphery of the turntables or by the use of a rack and pinion. This application shows non-powered devices that are activated by an operative manually rotating one of the plant pot supports.

All documents cited herein are incorporated by reference.

None of the above cited documents, alone or in combination satisfy the need for a combination of powered, linked, rotatably mounted turntables that addresses the above-mentioned deficiencies.

BRIEF SUMMARY

It is an object of the invention to provide a powered device with multiple rotating turntables.

In accordance with an aspect of the invention there is provided a powered device with multiple rotating turntables, said device comprising: a frame having three or more side members connected together via three or more corner members; a power generation unit operatively associated with a drive shaft; a driver pulley wheel mounted on said drive shaft; one or more driven pulley wheels mounted on said frame; and one or more means of transmitting rotational energy from said driver pulley wheel to said one or more driven pulley wheels, wherein said one or more driven pulley wheels are caused to rotate by rotation of said drive shaft.

In accordance with another aspect of the invention there is provided powered device with multiple rotating turntables, said device comprising: a frame having a linear or curved side member; a power generation unit operatively associated with a drive shaft; a driver pulley wheel mounted on said drive shaft; one or more driven pulley wheels mounted on said frame; and one or more means of transmitting rotational energy from said driver pulley wheel to said one or more driven pulley wheels, wherein said power generation unit and said one or more driven pulley wheels are rigidly fixed in relation to each other, said one or more driven pulley wheels being caused to rotate by rotation of said drive shaft.

In accordance with an additional aspect of the invention there is provided a method of installing the powered device as described above, said method comprising the steps of: arranging said three or more side members into desired shape of said frame; connecting said three or more side members using said three or more corner members; installing said power generation unit on said frame; mounting said driver pulley wheel on said drive shaft; mounting one or more driven pulley wheels on said frame; and connecting said driver pulley wheel to said one or more driven pulley wheels via said one or more means of transmitting rotational energy from said driver pulley wheel to said one or more driven pulley wheels, wherein said one or more driven pulley wheels are caused to rotate by rotation of said drive shaft.

The advantages and features of the present invention will become better understood with reference to the following more detailed description and claims taken in conjunction with the accompanying drawings in which like elements are identified with like symbols.

To easily identify the discussion of any particular element or act, the most significant digit or digits in a reference number refer to the figure number in which that element is first introduced.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 5A and 5B illustrate aspects of the subject matter in accordance with an alternative embodiment of the invention.

DETAILED DESCRIPTION

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

Embodiments of the invention as described herein relate to a series of linked rotatable turntables that can be powered by various means. The turntables are mounted onto a frame that can be configured into a plurality of different shapes and sizes. The turntables can be configured in numerous different heights and sizes and they can be driven in either a clockwise or counterclockwise direction. The device can be driven via various different mechanisms including, but not limited to, chain, belt hydraulic and pneumatic. The device may be powered by, for example, mains, battery or solar.

Devices and methods for carrying out the invention are presented in terms of embodiments depicted within the FIGS. However, the invention is not limited to the described embodiments, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and the configurations shall be shown and described for purposes of clarity and disclosure and not by way of limitation of scope.

Figure 1:
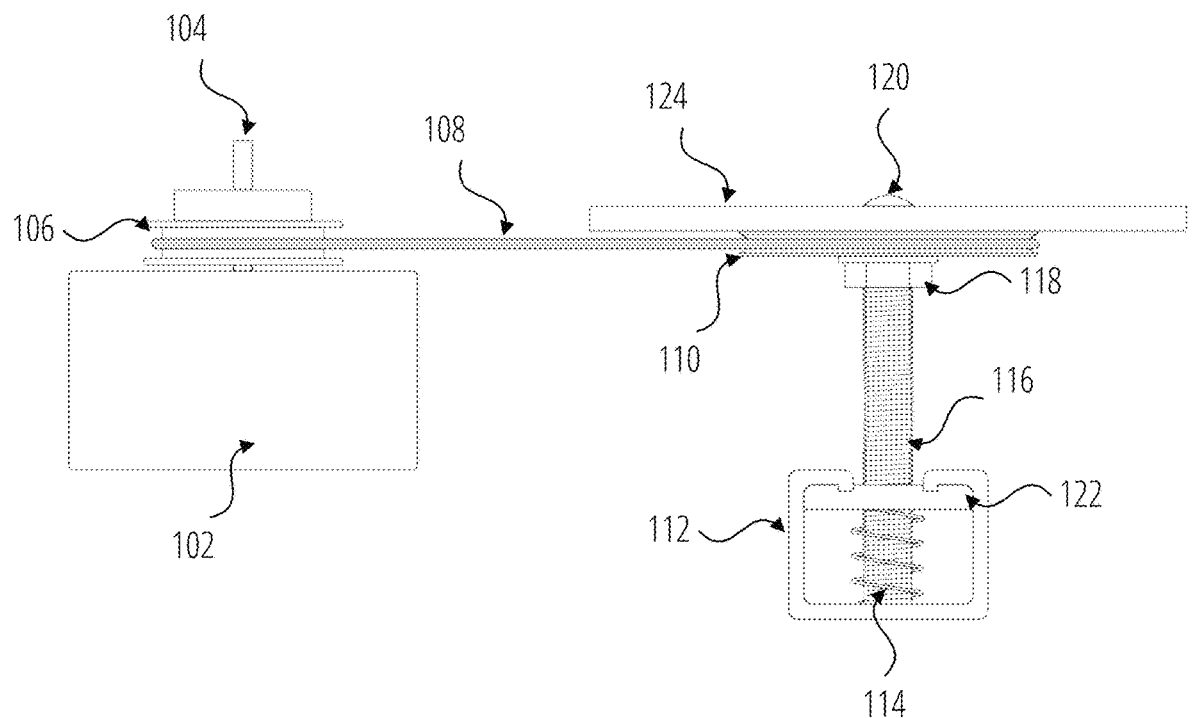
FIG. 1 illustrates a cross-sectional side view in accordance with an embodiment of the invention.

FIG. 1 shows a cross-sectional side view of an embodiment of the invention.

A power generation unit 102 is connected to a driver pulley wheel 106 via a drive shaft 104. A belt 108 connects the driver pulley wheel 106 to a driven pulley wheel 110. In this embodiment, the driven pulley wheel 110 is rigidly connected to a turntable 124 via a nut 118 and bolt 120. The lower end of the bolt 120 is attached to a frame, shown here as a Unistrut® channel 112. The height of the driven pulley wheel 110 can be raised or lowered by rotating the screw threaded shaft 116. An optional biasing means 114 may be present, as shown, to apply pressure on the securement plate 122.

As with all pulley wheel systems, the driver pulley wheel 106 is always mounted on a rotary part of the energy source so that power can be transferred through a belt to the driven pulley wheel or wheels 110.

Figure 2:
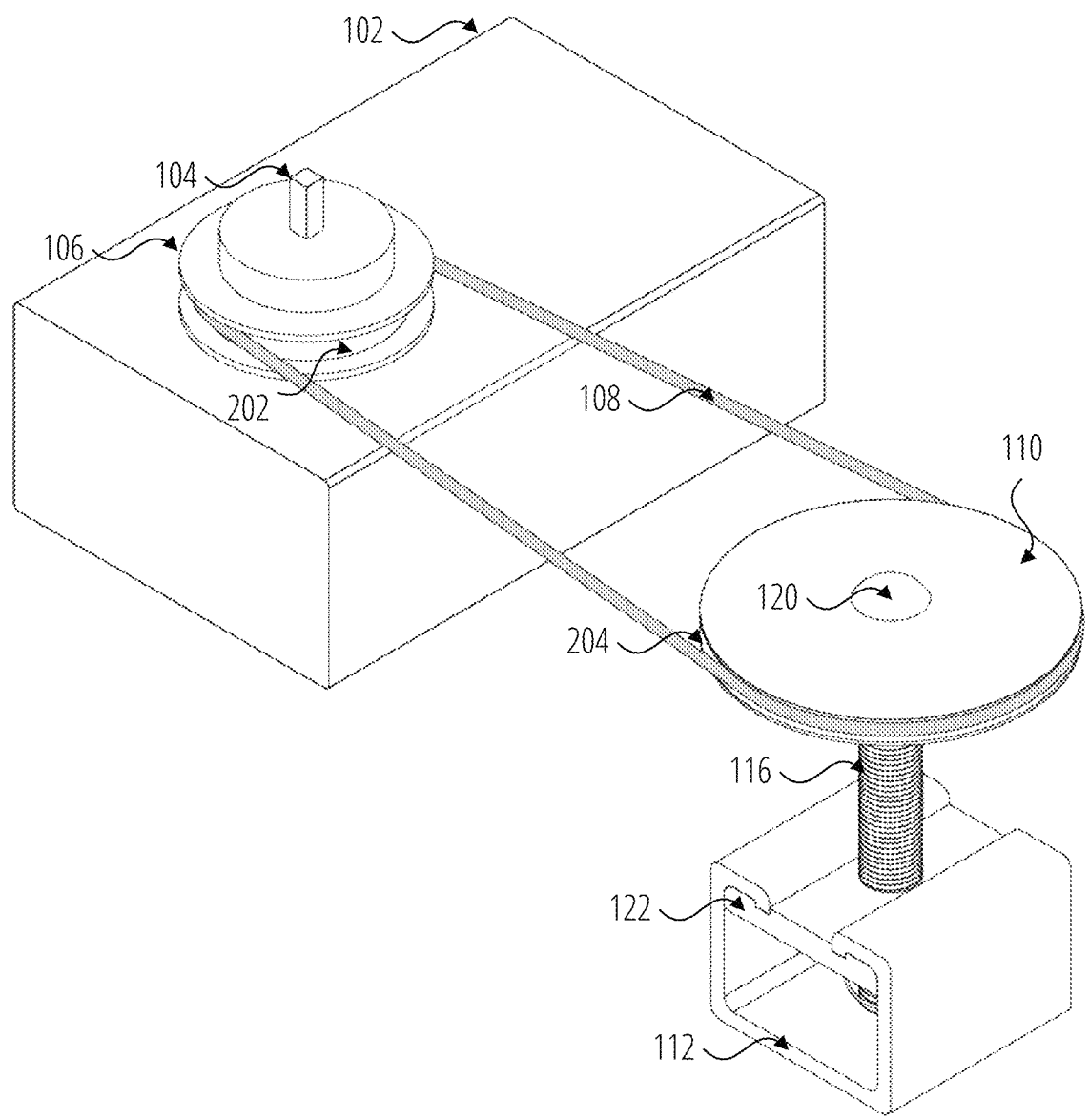
FIG. 2 illustrates a perspective view in accordance with one embodiment of the invention.

FIG. 2 shows a perspective side view of an embodiment of the invention.

A power generation unit 102 is connected to a driver pulley wheel 106 via a drive shaft 104. A belt 108 connects the driver pulley wheel 106 to a driven pulley wheel 110. In this embodiment, the driven pulley wheel 110 may either function as a turntable 124, or a separate turntable 124 may be affixed to the driven pulley wheel 110. The driven pulley wheel 110 is held in place by way of a nut 118 and bolt. The lower end of the bolt 120 is attached to a frame, shown here as a Unistrut® channel 112. The height of the driven pulley wheel 110 can be raised or lowered by rotating the screw threaded shaft 116. An optional biasing means 114 may be present, as shown, to apply pressure on the securement plate 122.

The belt 108 typically cooperates with a driver pulley wheel channel 202 on the drive shaft 104 of the driver pulley wheel 106 and the driven pulley wheel channel 204 on the screw threaded shaft 116 on the driven pulley wheel 110. For illustration purposes, the driver pulley wheel 106 is linked to only one driven pulley wheel 110 in this figure to show the means of connection. It is contemplated that one or more driven pulley wheels 110 may be driven by the driver pulley wheel 106, as shown in later FIGS.

The transmission of rotational motion from the driver pulley wheel 106 to the driven pulley wheel or wheels 110, is a function of the ratio of the circumference of the driver pulley wheel 106 to the driven pulley wheels 110 or driven pulley wheel 110. Essentially if the driver and driven pulley wheels are the same size, the driver and driven pulley wheels will rotate at the same speed. If the driver wheel is larger than the driven wheels, then the driven wheels will rotate faster than the driver wheel. Conversely, if the driver wheel is smaller than the driven wheels, then the driven wheels will rotate slower than the driver wheel.

Figure 3:
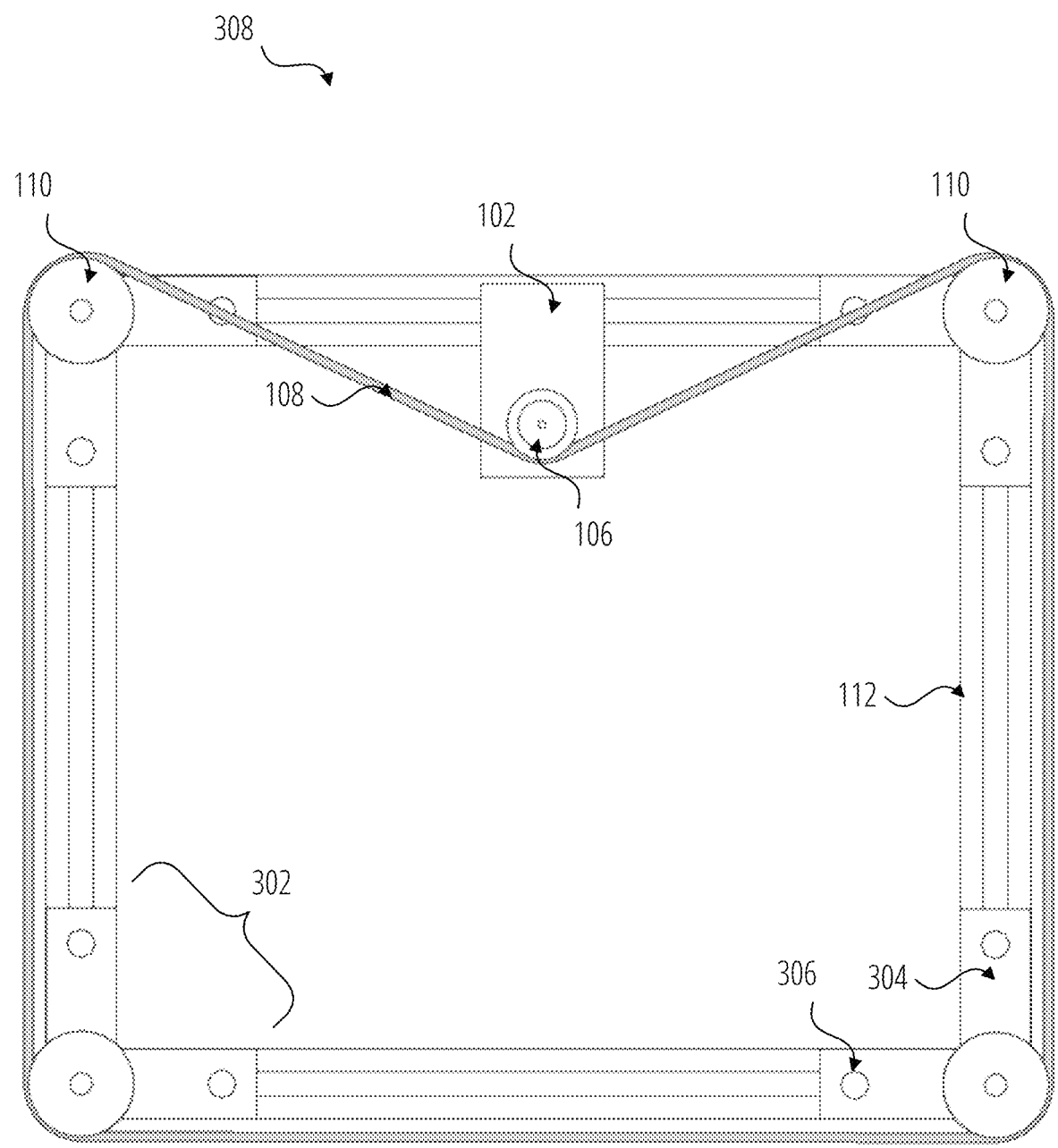
FIG. 3 illustrates a top view in accordance with one embodiment of the invention.

FIG. 3 shows a top view of an embodiment of the invention.

In this particular embodiment of the invention, the driver pulley wheel 106 drives four driven pulley wheels 110. The power generation unit 102 can be seen to me mounted onto a frame 308. The position of the power generation unit 102 is typically offset from the configuration of the driven pulley wheels 110. The connection of the power generation unit 102 to the frame 308 is also adjustable.

The offset nature of the power generation unit 102 from the driven pulley wheels 110, and the adjustability of the power generation unit 102 allows the operator to adjust the driver pulley wheel 106 to remove any slack that may from in the system, which reduces the efficiency of operation.

This particular embodiment is in an open belt drive configuration, wherein the shafts rotate in the same direction, hence the direction of rotation of the driver pulley wheel 106 is the same as the driven pulley wheels 110.

Appropriately sized turntables 124 may be mounted onto the top of the driven pulley wheels 110.

Figure 4:
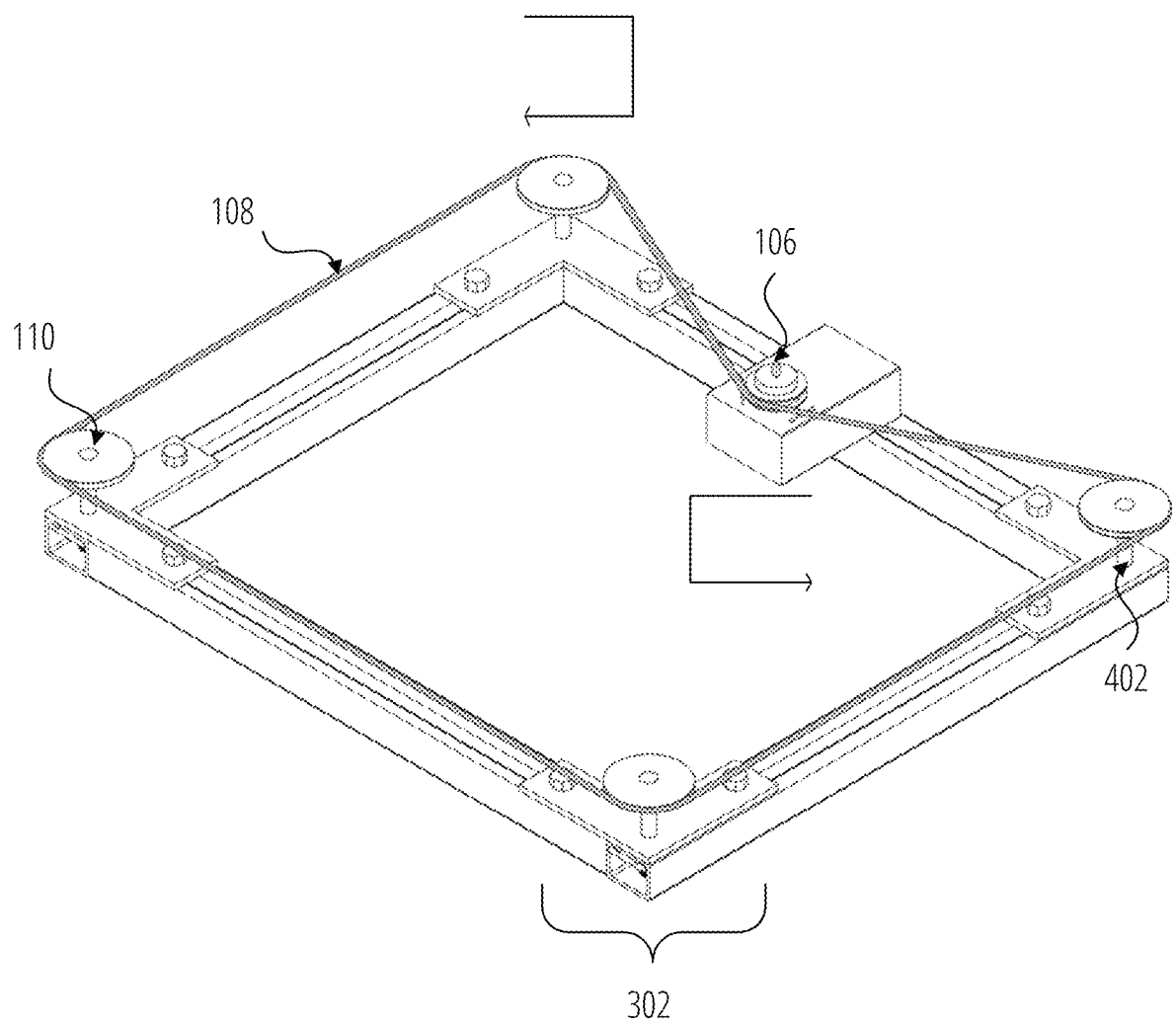
FIG. 4 illustrates a perspective view in accordance with one embodiment of the invention

FIG. 4 shows a perspective view of an embodiment of the invention.

This particular embodiment of the invention resembles the device illustrated in FIG. 3. The configuration as shown will result in the driver and driven pulley wheels rotating in different directions. For example; if the driver pulley wheel 106 rotates in an anticlockwise direction, then the driven pulley wheels 110 all will rotate in a clockwise direction, and vice versa.

It is possible to select different sized driven pulley wheels 110 of different sized driven pulley wheel channels 204 to result in different turntables rotating at different speeds.

It is also noteworthy to state that the vertical rotational drive shaft 104 on the power generation unit 102 may be individually linked to one or more of the driven pulley wheels 110 by one or more belts 108, if required.

FIGS. 5A and 5B show an alternative embodiment of the invention, having a number of turntables positioned at a higher elevation than others.

The embodiment shown has a driver pulley wheel 106 actuating six driven pulley wheels 110. As described in previous embodiments of the invention, the configuration of one or more belts 108 and the relative sizing of the driver pulley wheel channel 202 and driven pulley wheel channel 204 will determine the direction and speed of rotation of the turntables. With the embodiment illustrated in FIGS. 5A and 5B and additional height variation can be introduced.

In the embodiment as shown in FIG. 5A, the power generation unit 102 is located between a lower driven pulley wheel 506 and an elevated driven pulley wheel 502. In this configuration if may be necessary to install a guide rail (not shown) to retain the belt in the tracks of the driver pulley wheel channel 202 and driven pulley wheel channel 204. In other embodiments of the invention, where the power generation unit 102 is situated between two pulley wheels that are situated at a similarly height, the guide rail may not be required.

Figure 6A:
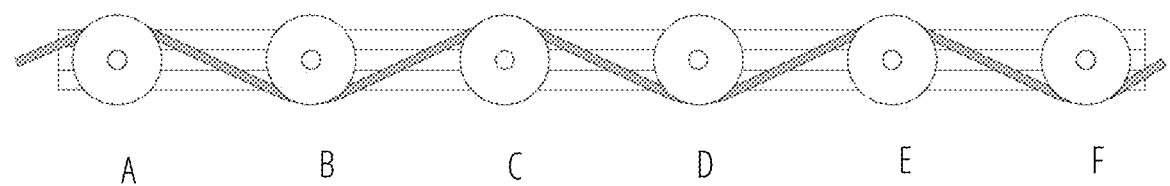
FIGS. 6A and 6B illustrate aspects of the subject matter in accordance with yet another embodiment of the invention.
Figure 6B:
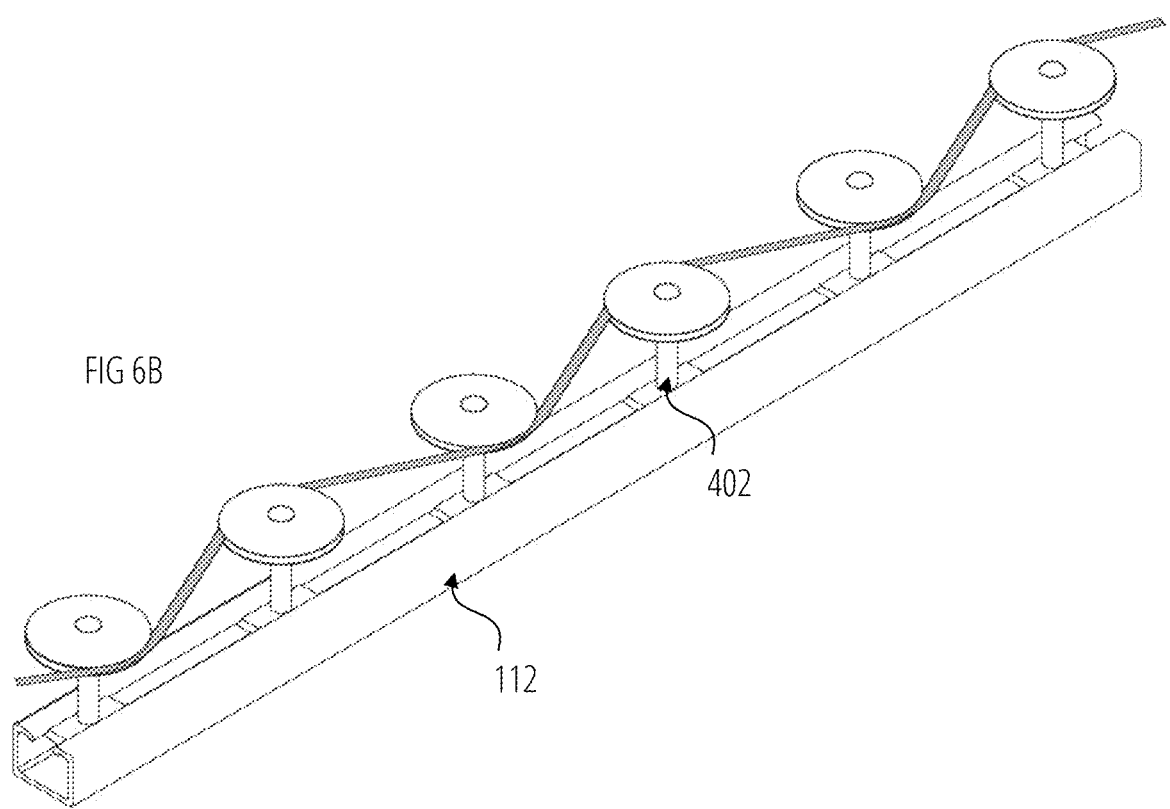

FIGS. 6A and 6B show an alternative embodiment of the invention, having a number of turntables positioned in a linear configuration.

The embodiment shown has a driver pulley wheel 106 actuating six driven pulley wheels 110. The power generation unit 102 (not shown) can be attached directly to the linear frame member. It can be readily envisaged that if turntable A rotates in a clockwise manner, then turntables C and E will similarly rotate in a clockwise manner. Consequently, turntables B, D, and F will rotate in an anti or counter clockwise manner. In an alternative arrangement both the power generation unit 102 and the linear frame member can be affixed to a separate solid surface.

The linear arrangement of driven pulley wheels 110 can form the sides of a frame having three or more sides, as illustrated in FIG. 3 and FIG. 4 for an embodiment having four sides, or they can constitute the entire arrangement of the device. The shafts 402 can be select to be of different heights as and when necessary.

In yet an alternative embodiment of the invention, the single frame member may be curved. The power generation unit 102 may be affixed directly to the curved member or it can be affixed to a separate solid surface. Another embodiment may involve the power generation unit 102 being situated at the virtual center of the arc described by the curve. The power generation unit 102 either being at the center, being fixed in place by way of spokes, of by directly affixing it and the curved frame member to the solid supporting surface.

Figure 7A:
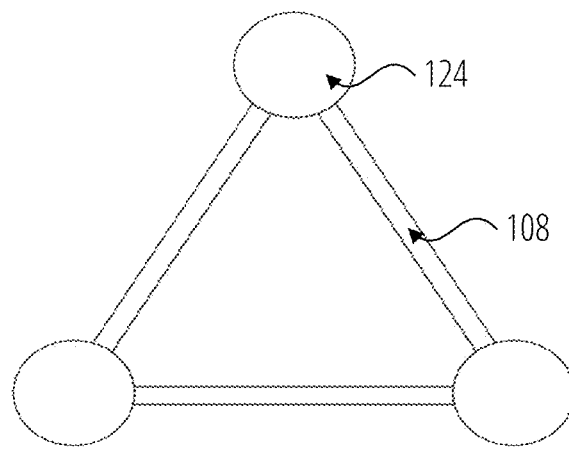
FIGS. 7A, 7B, and 7C illustrate aspects of the subject matter in accordance with a further embodiment of the invention.
Figure 7B:
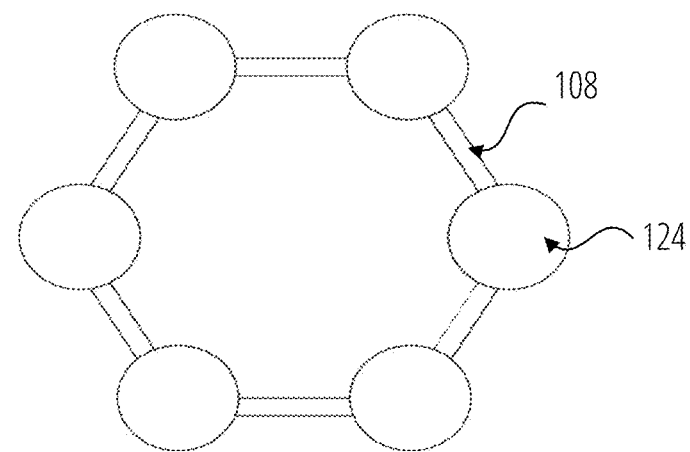
Figure 7C:
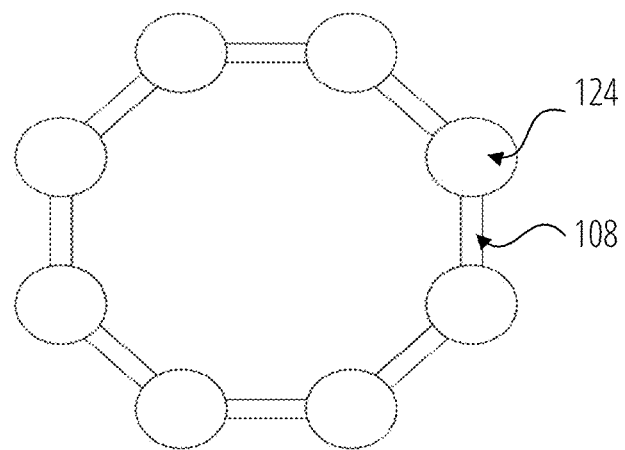

FIGS. 7A, B and C show a number of variations to the basic configuration of the frame 308 that is possible by using different angled corner pieces and different lengths of angle iron or Unistrut® channel 112.

It will be appreciated that various different embodiments of the invention are possible without departing from the basic details described above.

For example, the power generation unit 102 can be an AC or DC motor or another more specialized motor such as a direct drive, linear, servo or stepper motor. The power generation unit 102 that indirectly rotates the turntables 124 can be driven by gear, belt or any other mechanical gear reduced motor, of any voltage, driven by an electric, solar, hydraulic, or pneumatic means.

The power generated by the power generation unit 102 can be transmitted from the driver pulley wheel 106 to the driven pulley wheel 110 by a variety of different means. A belt is a common and versatile means of energy transmission. There are several different types of belts 108 including, but not limited to, flat belts, V-belts, and circular belts. Flat belts have a rectangular cross-section, they make very little noise and they are typically in the region of 98% efficient. V-belts are in trapezoidal cross-section and are well suited to transferring power over short distances. Circular belts have a circular cross-section and are better suited for longer distances and result in low noise and vibrations. Alternative transmission means may include chains, ropes and cables. The term 'belt' as used throughout this disclosure includes, but is not limited to all forms of transmission as described herein.

The frame can be constructed in a variety of different shapes and sizes. The frame members can be fabricated from numerous different types of material including, but not limited to, strut channeling such as plain strut, Unistrut®, Superstrut™, slotted strut, punched strut, and half strut. Angle iron is an alternative material that can be used to fabricate the frame. Various different angled corners can be used to create a plurality of different shapes of frame 308.

The driven pulley wheels 110 can to fixed at varying different heights. The driver pulley wheel 106 and the driven pulley wheels 110 can be selected to have different diameters to thereby vary the speed of rotation for the turntables 124 for a fixed speed of the driver pulley wheel 106. One or more belts can be driven by the power generation unit 102.

In some embodiments of the invention, the corners and joins between the individual side pieces may be welded together. Other embodiments of the frame include, but are not limited to factory pressing steel, the use of composite material, plastic injection molding and 3d printing using the appropriate thermoplastic polymers.

Regarding the multi-level style tables, it is contemplated that individual power generation units 102 may be appropriately situated to drive the driven pulley wheels and turntables at each level. This may be achieved by incorporating vertical drive shaft with pulleys at each level to turn all levels.

The uses for the different embodiments of the invention as described are numerous. In one embodiment, the turntables 124 can be sized and configured to accommodate plants. It turns individual plants or displays. Gear reduced motor, turns at slow rate to give even light distribution to plants or to better display products. The rotation of the turntables 124 will produce more even shaped plants. Large scale greenhouses could increase production and quality. Four table turntable 124 models may be more appropriate for the individual home owner or store front displays.

When the device is intended to be used in wet or humid surroundings, such as in horticulture applications, it may be necessary to waterproof certain elements. For example, the power generation unit(s) may be enclosed within a waterproof container. In such embodiments the driver and driven pulley wheels and all other parts and connections including shafts frames and corner connectors, may be fabricated from non-rusting materials. Suitable materials including, but are not limited to: galvanized steel; aluminum; stainless steel; red metals such as copper, brass and bronze; thermoplastic polymers such as high-density polyethylene; carbon fiber; and combinations thereof.

Moreover, when the device is intended to be used in horticulture applications, it may be necessary to encase exposed sections of the belt through piping to ensure that trailing plant fronds or tendrils do not wrap around the belt. In some embodiments, the pipes are rigid plastic that are affixed in close proximity to each to the driver and driven pulley wheels. It is important that the tubing is fixed in position so as to ensure that the belt does not touch the pipe, in order to not reduce the efficiency of the system.

Alternative uses include as a display stand for various commercial products including, but not limited to jewelry displays, bakery displays, shoes/sneakers, purses, household items such as glassware, crockery and tableware.

The foregoing descriptions of specific embodiments of the present invention have been presented for purposes of illustration and description. They are not intended to be exhaustive or to limit the invention and method of use to the precise forms disclosed. Many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A continuous frame structure with multiple rotating turntables, said continuous frame structure comprising:
   a frame having a number of side members connected together via a number of corner members, the number of side members being the same as the number of corner members;
   a power generation unit fixed to the frame and operatively coupled to a threaded drive shaft, the power generation unit adjustably offset from the frame;
   a driver pulley wheel mounted on said threaded drive shaft;
   one or more driven pulley wheels mounted on said frame; and one or more means of transmitting rotational energy from said driver pulley wheel to said one or more driven pulley wheels, wherein said one or more driven pulley wheels are caused to rotate by rotation of said threaded drive shaft.

2. The continuous frame structure of claim 1, wherein each driven pulley wheel of the one or more driven pulley wheels has a turntable affixed to an upper surface of said driven pulley wheel of the one or more driven pulley wheels.

3. The continuous frame structure of claim 1, wherein said means of transmitting rotational energy from said driver pulley wheel to said one or more driven pulley wheels is selected from the group consisting of a belt, chain or rope.

4. The continuous frame structure of claim 3, wherein said belt is a flat belt, V-belt, or circular belt.

5. The continuous frame structure of claim 1, wherein at least one of:

said frame is constructed from strut channeling or angle iron;

said frame has four side members and four corner members; and said frame has four side members and four corner members which are right angled.

6. The continuous frame structure of claim 1, wherein the power generation unit is selected from the group consisting of: an Alternating Current (AC) or Direct Current (DC) motor, direct drive motor, linear motor; servo motor; or stepper motor.

7. The continuous frame structure of claim 1, wherein the driven pulley wheels are driven by a mechanical gear reduced motor of any voltage, mains electricity, solar power, hydraulic, or pneumatic means.

8. The continuous frame structure of claim 1, wherein said driver pulley wheel has a circular driver pulley wheel channel and said driven pulley wheel has a circular driven pulley wheel channel sized and proportioned to accommodate said one or more means of transmitting rotational energy.

9. The continuous frame structure of claim 8, wherein either:

said circular driver pulley wheel channel has a diameter that is greater than a diameter of said circular driven pulley wheel channel;

or:

said circular driver pulley wheel channel has a diameter that is lesser than a diameter of said circular driven pulley wheel channel.

10. A method of installing the continuous frame structure of claim 1, said method comprising the steps of:

arranging said number of side members into a desired shape of said frame;

connecting said number of side members using said number of corner members;

installing said power generation unit on said frame;

mounting said driver pulley wheel on said threaded drive shaft;

mounting said one or more driven pulley wheels on said frame; and connecting said driver pulley wheel to said one or more driven pulley wheels via said one or more means of transmitting rotational energy from said driver pulley wheel to said one or more driven pulley wheels, wherein said one or more driven pulley wheels are caused to rotate by rotation of said threaded drive shaft.

11. The method of installing the continuous frame structure of claim 10, comprising the additional step of adjusting the height of one or more of said one or more driven pulley wheels.

12. The method of installing the continuous frame structure of claim 10, comprising the additional step of attaching one or more turntables onto an upper surface of said one or more driven pulley wheels.

13. The method of installing the continuous frame structure of claim 10, comprising the additional step of selecting a diameter of said driver pulley wheel and each of said one or more driven pulley wheels to provide the specific rate of rotation desired.

14. A continuous frame structure with multiple rotating turntables, comprising:

a frame having a number of side members connected together via a number of corner members;

a power generation unit fixed to the frame and operatively coupled to a drive shaft, the power generation unit adjustably offset from the frame;

a driver pulley wheel mounted on said drive shaft;

one or more driven pulley wheels mounted on said frame; and one or more means of transmitting rotational energy from said driver pulley wheel to said one or more driven pulley wheels; wherein said one or more driven pulley wheels are caused to rotate by rotation of said drive shaft.

15. The continuous frame structure of claim 14, wherein each driven pulley wheel of the one or more driven pulley wheels has a turntable affixed to an upper surface of said driven pulley wheel of the one or more driven pulley wheels.

16. The continuous frame structure of claim 14, wherein each means of transmitting rotational energy of the one or more means of transmitting rotational energy from said driver pulley wheel to said one or more driven pulley wheels is selected from the group consisting of a belt, a chain, a rope, a flat belt, a V-belt and a circular belt.

17. A continuous frame structure with multiple rotating turntables, comprising:

a frame;

a power generation unit fixed to the frame and operatively coupled to a drive shaft where the power generation unit is adjustably offset from the frame;

a driver pulley wheel mounted on said drive shaft;

one or more driven pulley wheels mounted on said frame; and one or more means of transmitting rotational energy from said driver pulley wheel to said one or more driven pulley wheels; wherein said one or more driven pulley wheels are caused to rotate by rotation of said drive shaft.

18. The continuous frame structure of claim 17, wherein each driven pulley wheel of the one or more driven pulley wheels has a turntable affixed to an upper surface of said driven pulley wheel of the one or more driven pulley wheels.

19. The continuous frame structure of claim 17, wherein each means of transmitting rotational energy of the one or more means of transmitting rotational energy from said driver pulley wheel to said one or more driven pulley wheels is selected from the group consisting of a belt, a chain, a rope, a flat belt, a V-belt and a circular belt.

20. The continuous frame structure of claim 17, wherein the one or more means of transmitting rotational energy from said driver pulley wheel to said one or more driven pulley wheels is one of a single belt, single chain or single rope coupled to the driver pulley wheel and the one or more driven pulley wheels.

\* \* \* \* \*